United States Patent
Ko et al.

(10) Patent No.: US 11,350,620 B2
(45) Date of Patent: Jun. 7, 2022

(54) INSECTICIDE FUMIGATOR FOR LURING MOSQUITOS BY MEANS OF ULTRAVIOLET LIGHT EMITTING DIODE

(71) Applicant: Seoul Viosys Co., Ltd., Ansan-si (KR)

(72) Inventors: Mi So Ko, Ansan-si (KR); Yeo Jin Yoon, Ansan-si (KR)

(73) Assignee: Seoul Viosys Co., Ltd., Ansan-si (KR)

(*) Notice: Subject to any disclaimer, the term of this patent is extended or adjusted under 35 U.S.C. 154(b) by 86 days.

(21) Appl. No.: 16/128,069

(22) Filed: Sep. 11, 2018

(65) Prior Publication Data

US 2019/0008135 A1 Jan. 10, 2019

Related U.S. Application Data

(63) Continuation of application No. PCT/KR2017/002501, filed on Mar. 8, 2017.

(30) Foreign Application Priority Data

Mar. 11, 2016 (KR) .................. 10-2016-0029791
Feb. 22, 2017 (KR) .................. 10-2017-0023460

(51) Int. Cl.
*A01M 1/04* (2006.01)
*A01M 1/20* (2006.01)

(52) U.S. Cl.
CPC ............ *A01M 1/2077* (2013.01); *A01M 1/04* (2013.01); *A01M 1/2061* (2013.01); *A01M 1/2066* (2013.01)

(58) Field of Classification Search
CPC ...... A01M 1/023; A01M 1/04; A01M 1/2016; A01M 1/2022; A01M 1/2061; A01M 1/2066

(Continued)

(56) References Cited

U.S. PATENT DOCUMENTS 5,095,647 A * 3/1992 Zobele ................ A01M 1/2077
239/135
5,142,815 A * 9/1992 Birdsong .............. A01M 1/145
43/113

(Continued)

FOREIGN PATENT DOCUMENTS

CN 203985706 12/2014
JP 3085542 U 2/2002

(Continued)

OTHER PUBLICATIONS

International Search Report dated May 15, 2017, in International Application No. PCT/KR2017/002501 (with English Translation).

(Continued)

*Primary Examiner* — David J Parsley
(74) *Attorney, Agent, or Firm* — H.C. Park & Associates, PLC

(57) ABSTRACT

An insecticide fumigator including a chemical cartridge mount on which a chemical cartridge is configured to be mounted, a heater disposed near the chemical cartridge mount and configured to heat the chemical cartridge such that an insecticide in the chemical cartridge is evaporated from a fumigation part of the chemical cartridge, a light source disposed near the fumigation part and configured to emit light having a first wavelength range to attract insects, and a housing provided with the chemical cartridge mount and receiving the heater and the light source, in which the light source includes a UV LED and a substrate on which the UV LED is mounted, and the housing has a light passage hole through which light emitted from the light source passes.

18 Claims, 9 Drawing Sheets

(58) Field of Classification Search
USPC ....... 43/113, 122, 124, 125, 129, 131, 132.1
See application file for complete search history.

(56) References Cited

U.S. PATENT DOCUMENTS

| | | | |
|---|---|---|---|
| 6,854,208 B1* | 2/2005 | Chuang | A01M 1/2027 |
| | | | 261/84 |
| 6,968,124 B1 | 11/2005 | Varanasi et al. | |
| 8,845,118 B2* | 9/2014 | Formico | F21V 33/006 |
| | | | 362/96 |
| 2006/0237439 A1 | 10/2006 | Norwood et al. | |
| 2007/0056208 A1* | 3/2007 | Chen | A01M 1/02 |
| | | | 43/113 |
| 2009/0100743 A1 | 4/2009 | Prater | |
| 2016/0000060 A1 | 1/2016 | Sandford et al. | |

FOREIGN PATENT DOCUMENTS

| | | |
|---|---|---|
| JP | 2014-050319 | 3/2014 |
| KR | 10-2007-0055427 | 5/2007 |
| KR | 10-2008-0086083 | 9/2008 |
| WO | 2014-134371 | 9/2014 |

OTHER PUBLICATIONS

Office Action dated Mar. 2, 2021, issued in Japanese Patent Application No. 2018-547894.

* cited by examiner

INSECTICIDE FUMIGATOR FOR LURING MOSQUITOS BY MEANS OF ULTRAVIOLET LIGHT EMITTING DIODE

CROSS-REFERENCE TO RELATED APPLICATIONS

This application is a Continuation of International Patent Application No. PCT/KR2017/002501, filed on Mar. 8, 2017, and claims priority from and the benefit of Korean Patent Application No. 10-2016-0029791, filed on Mar. 11, 2016, and Korean Patent Application No. 10-2017-0023460, filed on Feb. 22, 2017, all of which are incorporated by reference for all purposes as if fully set forth herein.

BACKGROUND

Field

Exemplary embodiments relate to an insecticide fumigator and, more particularly, to an insecticide fumigator which attracts insects, such as mosquitoes, to a region where an evaporated insecticide is present in high concentrations using a UV LED, such that the attracted mosquitoes can be readily killed by the highly concentrated insecticide.

Discussion of the Background

Insecticides are chemicals that are highly effective in killing insect pests, such as mosquitoes, while imposing minimal risks to humans. In particular, household insecticides in general target mosquitoes, cockroaches, and ants.

Recently, fumigation using a pad impregnated with a mosquito repellent or using a liquid mosquito repellent in a container is being widely used for removing mosquitoes, instead of a method of spraying an aerosol-type mosquito repellent or burning a mosquito coil. Such a fumigation method slowly spreads a mosquito repellent such that the mosquito repellent is hardly odorous and can be continuously used overnight, and thus is particularly suitable for use in private households.

However, an electric insecticide fumigator may not be effective in killing mosquitoes far from the fumigator, such that a person sleeping at a distance from the fumigator is likely to be bitten by mosquitoes.

Since the insecticide concentration in air decreases with an increasing distance from the fumigator, mosquitoes having a tolerance to insecticides are less affected by the insecticide when it is at a certain distance from the fumigator.

Accordingly, to avoid being bitten by mosquitoes during sleep, the fumigator should be installed near a user or several fumigators be installed to increase the insecticide concentration in the air and eliminate a "dead zone" without any insecticide in the air. However, exposing a user in a place with high insecticide concentrations may impose risks of suffering various side effects, particularly, to a children or elderly whom are vulnerable to fine dust or ultrafine dust.

SUMMARY

Exemplary embodiments of the present invention have been conceived to overcome such a problem in the art. Exemplary embodiments provide an insecticide fumigator capable of improving insecticidal efficacy without increasing fumigation rate and improving insecticidal efficacy without harm to the human body.

Exemplary embodiments further provide an insecticide fumigator that is easy to manufacture by reducing the number of parts and simplifying an assembly process.

Exemplary embodiments also provide an insecticide fumigator having high luminous efficacy while emitting light having high mosquito luring efficacy, thereby achieving high insecticidal efficacy and high energy efficiency.

Exemplary embodiments still provide an insecticide fumigator including a cover allowing mosquito-luring light to be refracted or diffused therethrough, thereby improving mosquito luring efficacy while preventing UV light from being directly radiated to the human eye.

Exemplary embodiments yet provide an insecticide fumigator including a guide rail for guiding the movement of a UV LED to facilitate redirection of mosquito-luring light, thereby improving mosquito luring efficacy regardless of installation conditions.

An insecticide fumigator according to an exemplary embodiment includes a chemical cartridge mount on which a chemical cartridge is configured to be mounted, a heater disposed near the chemical cartridge mount and configured to heat the chemical cartridge such that an insecticide in the chemical cartridge is evaporated from a fumigation part of the chemical cartridge, a light source disposed near the fumigation part and configured to emit light having a first wavelength range to attract insects, and a housing provided with the chemical cartridge mount and receiving the heater and the light source, in which the light source includes a UV LED and a substrate on which the UV LED is mounted, and the housing has a light passage hole through which light emitted from the light source passes.

The insecticide fumigator may further include a protective window disposed over the light passage hole, the protective window including a material having high UV transmittance.

The insecticide fumigator may further include an air inlet hole formed on a portion of the housing, the air inlet being formed to oppose the heater with respect to the light source.

A center line of a light emission angle of the UV LED may be tilted at an angle of 90 degrees or less with respect to a vertical line intersecting a bottom surface of the insecticide fumigator.

The insecticide fumigator may further include a reflective film disposed on a surface of the housing behind the UV LED to redirect UV light emitted upward.

The light passage hole may restrict a radiation range of UV light emitted outside the housing.

The radiation range of UV light emitted may be within an angle of 30 degrees or less with respect to a vertical line intersecting a bottom surface of the insecticide fumigator the vertical line.

The insecticide fumigator may further include a reflective film disposed at a portion of the light passage hole.

The light source may be disposed at a rear side of the housing to emit UV light adjacent to a plug of the insecticide fumigator.

The insecticide fumigator may further include a lens disposed on the UV LED, in which the lens has a shape in which, at least in some sections, a distance from a light emission point of the UV LED to an outer surface of the lens increases with an increasing distance from a central axis of a light emission region of the UV LED.

The lens may include a recessed region centered on the central axis of the light emission region of the UV LED and extending from the central axis of the light emission region at a predetermined angle.

The insecticide fumigator may further include a plug disposed at a rear side of the housing and protruding outwardly.

The insecticide fumigator may further include a shielding member disposed between the light source and the heater to prevent heat generated by the heater from being transferred to the light source.

The shielding member may have a shape of a vane to guide air introduced through an air inlet hole formed in the housing to an air outlet hole disposed above the air inlet hole.

The air outlet hole may include a fumigation hole formed through the housing above the fumigation part.

The housing may include a first housing and a second housing coupled to each other, the first housing including a heater securing member to secure the heater, a light source securing member to secure the light source, and a peak wavelength in a range of about 360 nm to about 370 nm.

The second housing may include at least one of a heater support member to prevent the heater from being separated from the heater securing member after the second housing is coupled to the first housing, and a light source support member to prevent the light source from being separated from the light source securing member after the second housing is coupled to the first housing.

A peak wavelength of light emitted from the light source may be in a range of about 360 nm to about 370 nm.

The insecticide fumigator may further include a cover covering the light source, in which the light source is disposed at a front side of the housing to emit UV light towards a first direction intersecting a bottom surface of the insecticide fumigator.

The housing may include a guide rail disposed on a portion of the housing by which the light source is moved therealong, and a cover covering the guide rail.

DESCRIPTION OF THE DRAWINGS

The accompanying drawings, which are included to provide a further understanding of the disclosed technology, and are incorporated in and constitute a part of this specification, illustrate exemplary embodiments of the disclosed technology, and together with the description serve to describe the principles of the disclosed technology.

DETAILED DESCRIPTION OF THE ILLUSTRATED EMBODIMENTS

Figure 1:
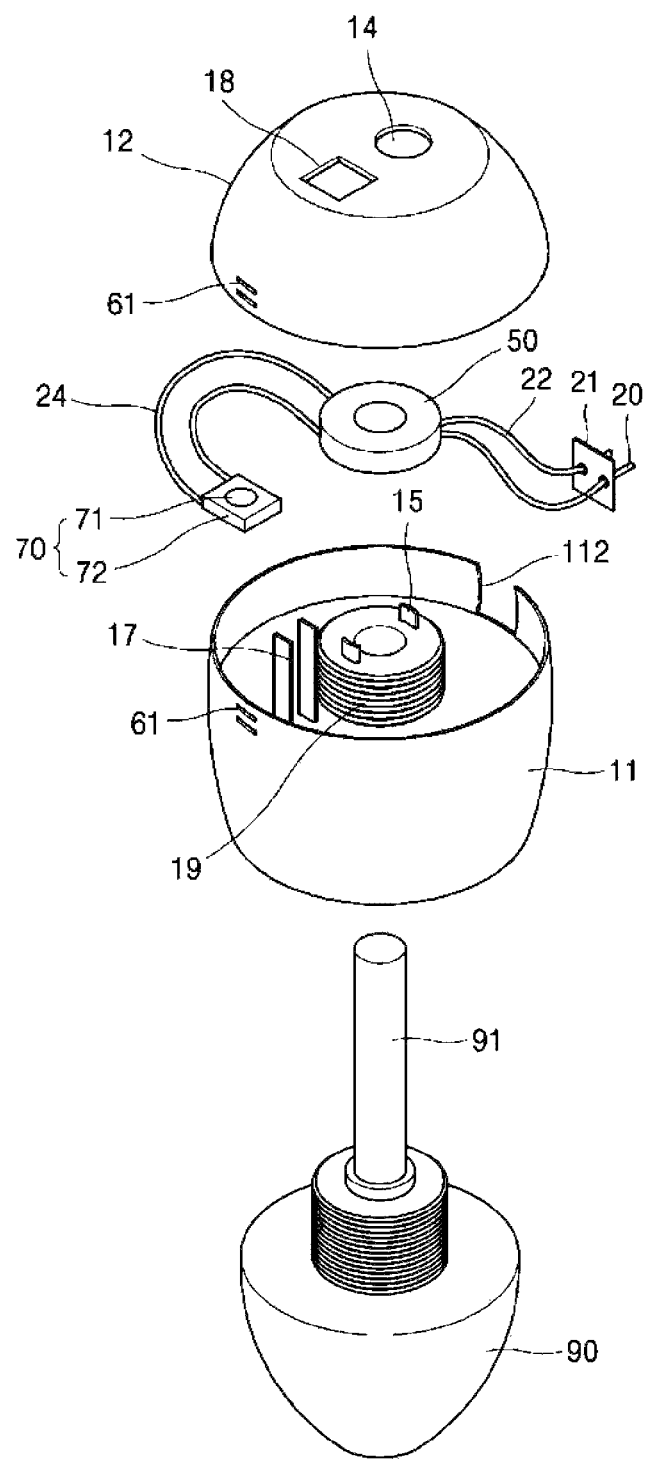
FIG. 1 is an exploded perspective view of an insecticide fumigator according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

It should be understood that the present invention may be embodied in different ways and is not limited to the following embodiments, which are provided for complete disclosure and thorough understanding of the present invention by those skilled in the art.

In addition, the terms "front side" and "rear side", as used herein with regard to a housing, may be changed depending on installation conditions of an insecticide fumigator according to the present invention. For example, "rear side" may refer to a planar or curved surface of a housing facing a wall and "front side" may refer to a planar or curved surface of the housing facing in the opposite direction of the wall.

Figure 2:
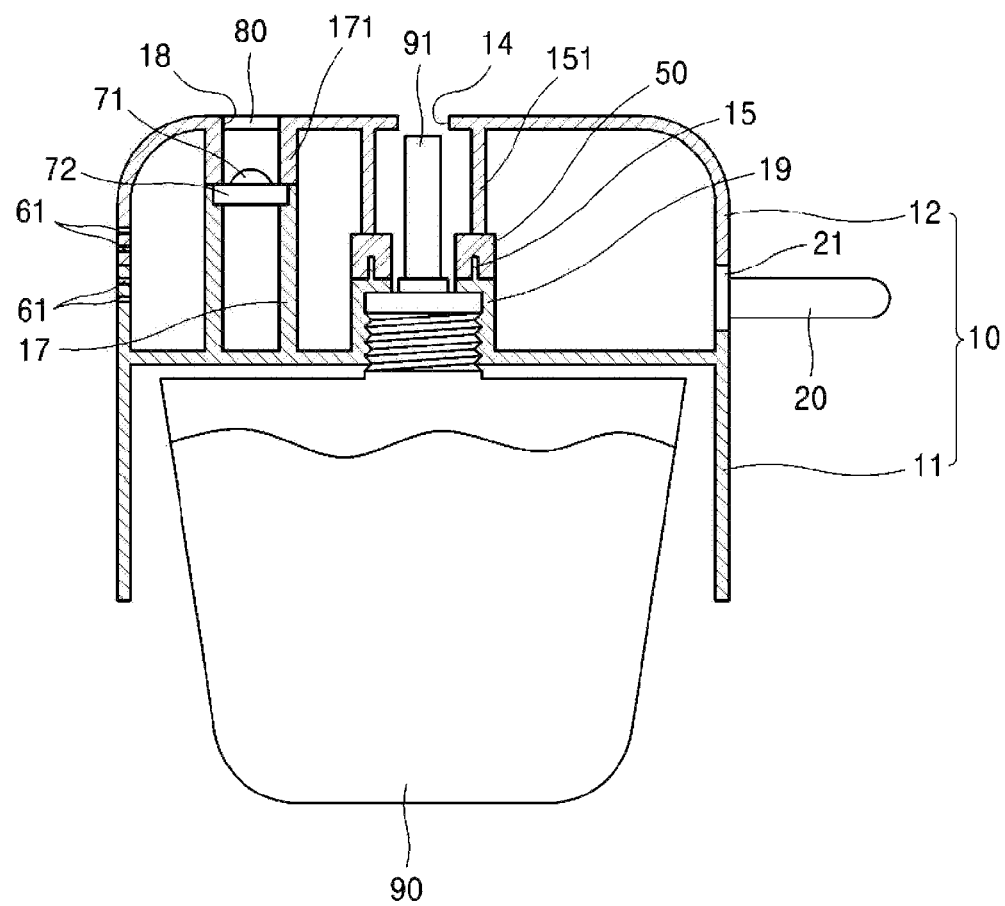
FIG. 2 is a cross-sectional view of the insecticide fumigator of FIG. 1.

FIG. 1 is an exploded perspective view of an insecticide fumigator according to an exemplary embodiment and FIG. 2 is a cross-sectional view of the insecticide fumigator of FIG. 1.

Referring to FIGS. 1 and 2, an insecticide fumigator according to an exemplary embodiment includes a housing 10 defining an external appearance of the fumigator, a chemical cartridge 90 securely fitted into to the housing 10, and a heater 50 disposed in the housing 10 to heat a fumigation part 91 of the chemical cartridge 90. When electric power is supplied to the heater 50 through a plug 20, a mosquito insecticide contained in the fumigation part 91 gradually evaporates and spreads into air. The chemical cartridge 90 is provided in the form of a container that contains a liquid mosquito insecticide, where a lower end of the fumigation part 91 is immersed in the liquid insecticide inside the container, such that when an upper portion of the fumigation part 91 is heated the insecticide in the fumigation part 91 is evaporated, the liquid insecticide contained in the container continuously flows up the fumigation part 91 by capillary action.

One of the inventive concepts includes attracting (or luring) mosquitoes to a space around the fumigator, where the insecticide evaporated from the fumigation part 91 is present in highest concentrations, and killing the attracted mosquitoes. Accordingly, the fumigator according to an exemplary embodiment includes a light source disposed near a fumigation hole 14, through which the evaporated insecticide is spread, to emit light with high mosquito luring efficacy to a space above the fumigator. In this manner, distant mosquitoes that would not normally be affected by the evaporated insecticide can be attracted around the fumigator, particularly to the space above the fumigator.

According to an exemplary embodiment, a UV LED 71 may be used as the light source 70 emitting light with high mosquito luring efficacy. Since the UV LED 71 has a narrower spectral line half-width than typical UV lamps, that is, has the intensity of radiation concentrated near a peak wavelength, it may be advantageous in terms of intensively radiating light at a wavelength that is effective in providing specific effects, such as mosquito attraction. Such advantageous effects of the UV LED 71 were confirmed through the following experiment.

The following is the result of an insect trapping test using an insect trap equipped with a UV LED and an insect trap equipped with a typical commercially available blacklight (BL) lamp under the same conditions. Specifications of the two light sources are shown in Table 1.

TABLE 1

|  | Voltage (V) | Current (A) | Power (W) | PF | Peak wavelength (Wp, nm) | Spectrum half-width (Fw, nm) | Radiant flux ($\Phi$e, mW) | $\Phi$v (lm) |
| --- | --- | --- | --- | --- | --- | --- | --- | --- |
| UV LED | 220.1 | 0.034 | 4.98 | 0.66 | 367.94 | 9.24 | 759.19 | 5.7 |
| Blacklight lamp | 220.1 | 0.247 | 6.4 | 0.12 | 365.88 | 18.36 | 528.8 | 8.37 |

Both of the light sources were designed to have similar peak wavelengths of about 365 nm in order to verify how much mosquito attraction is influenced by factors other than the peak wavelength. Comparing specifications between the two light sources, the UV LED had a spectral line half-width that is about half of that in the BL lamp, and a luminosity of 133 mW/lm, which was more than twice as high as that of the BL lamp (63 mW/lm).

The test was conducted twice in an outdoor barn, and the number (trap index) of insects trapped overnight was as shown in Table 2.

TABLE 2

|  |  | Trap index | | Mean trap rate (%) (standard deviation) | |
| --- | --- | --- | --- | --- | --- |
| Species | Vector disease | B/L | UV LED | B/L | UV LED |
| Aedes vexans | West Nile Fever | 1 0 | 7 0 | 12.5 (—) | 87.5 (—) |
| Anopheles sinensis | Malaria | 296 316 | 1,028 2,500 | 16.8b (7.9) | 83.2a (7.9) |
| Culex | West Nile | 118 | 497 | 17.8b | 82.2a |

TABLE 2-continued

| Species | Vector disease | Trap index B/L | Trap index UV LED | Mean trap rate (%) (standard deviation) B/L | Mean trap rate (%) (standard deviation) UV LED |
|---|---|---|---|---|---|
| *pipiens* | Fever | 104 | 536 | (2.1) | (2.1) |
| *Cx. tritaeniorhynchus* | J. Encephalitis | 687 | 3,307 | 14.8b | 85.2a |
| | | 452 | 3,196 | (3.4) | (3.4) |
| *Mansonia uniforms* | | 145 | 269 | 26.5b | 73.5a |
| | | 80 | 368 | (12.1) | (12.1) |
| Total | | 1,247 | 5,108 | 16.1b | 83.9a |
| | | 952 | 6,600 | (4.9) | (4.9) |

As can be seen from the results shown in Table 2, the UV LED insect trap had trapping efficacy more than 5 times greater than that of the typical BL lamp insect trap. This is thought to be due to the fact that a UV LED has a much narrower spectral line half-width than a typical UV lamp, and thus can emit UV light in a desired wavelength range in a concentrated manner and light emitted from the UV LED has directivity, and thus, can be concentrated in a target area. More particularly, the fumigator according to an exemplary embodiment employing a UV LED as light source has a mosquito luring efficacy at least 5 times greater than that using a typical UV lamp, and can concentrate UV light in a target area due to directivity thereof.

Although UV light in the UVA range is known to be able to attract insects, however, wavelengths in the UVA range that are particularly effective in attracting insects have not been discovered. Indeed, a lamp emitting UV light in the UVA region attracts more insects than a lamp emitting UV light outside the UVA region. However, since a UV LED has a much narrower spectral line half-width than a typical UV lamp, the particular peak wavelength of the UV light that is more effective in attracting insects is important. In particular, two UV LEDs emitting UV light at different wavelengths in the UVA range and having emission peak wavelengths can have different mosquito luring efficacies from each other. As can be seen from the experimental results shown in Table 2, the UV LED emitting UV light near a wavelength of 365 nm in a more concentrated manner from a narrower spectral line half-width thereof lured more mosquitoes thereto than the typical BL lamp, which emits UV light over a wide range of wavelengths with respect to 365 nm due to its wider spectral line half-width. Therefore, it can be assumed that UV light near 365 nm has the highest mosquito luring efficacy.

Based on the above experimental results, a UV LED emitting UV light having a peak wavelength of 365 nm is used as the light source of exemplary embodiments. Considering the spectral line half-width of the UV LED, a UV LED emitting UV light having a peak wavelength of about 360 nm to about 370 nm is expected to have an equivalent effect.

According to an exemplary embodiment, a substrate 72 to which the UV LED 71 is mounted is disposed in the housing 10, such that UV light is directly or indirectly radiated at least toward above the fumigator. For convenience of assembly, two or more housing parts separately fabricated may be assembled into the housing 10. For example, the housing 10 may include a first housing 11 and a second housing 12 which are coupled to each other with various components disposed therein after being separately fabricated.

The first housing 11 may be used as a housing part to which various components are secured. The first housing 11 includes a chemical cartridge mount 19 at the center thereof, to which the chemical cartridge 90 is irremovably coupled through screw fastening. The chemical cartridge mount 19 is formed at the center of the first housing 11 with a through-hole through which the fumigation part 91 of the chemical cartridge 90 is inserted into the housing 10.

The chemical cartridge mount 19 is provided with a heater securing member 15 at an upper surface thereof, to which the heater 50 heating the fumigation part 91 is disposed. The heater securing member 15 is provided in the form of a projection protruding upward to be interference-fitted into a groove formed on the heater 50, such that the heater 50 is secured to the first housing 11. However, the inventive concepts are not limited thereto, and the heater 50 may be secured to the first housing 11 by any suitable securing method, so long as the heater 50 can be easily secured to the first housing 11 by any methods in the process of assembly.

The heater 50 is a donut-shaped heating element and converts electric energy into thermal energy to heat the fumigation part 91. The heater 50 is electrically connected to a power source through the plug 20 and a wire 22, which will be described in more detail below. When the chemical cartridge 90 is mounted on the chemical cartridge mount 19, the fumigation part 91 of the chemical cartridge 90 is inserted into the donut-shaped heater 50. In this manner, the heater 50 surrounds the fumigation part 91, such that heat generated by the heater 50 can be effectively transferred to the fumigation part 91.

The plug 20 may be put into a wall receptacle to supply external power to the fumigator. The plug 20 is secured to a fastening plate 21 and is electrically connected to the heater 50 and the substrate 72 via the wire 22 and a wire 24, respectively. The plug 20 secured to the fastening plate 21 is secured to the first housing 11 after being connected to the heater 50 and the light source 70 via the wires 22 and 24, respectively.

The plug 20 is secured to the first housing 11 by placing the fastening plate 21 into a plug securing portion 112 of the first housing 11. Here, mutual coupling between the fastening plate 21 and the plug securing portion 112 is accomplished by fitting the fastening plate 21 into the plug securing portion 112 from above. Then, the heater 50 is secured to the first housing 11, as described above, and the substrate 72 with the UV LED 71 mounted thereon is fitted into the light source securing member 17. The first housing 11 may be formed of a synthetic resin having a predetermined degree of elasticity, such that the substrate 72 can be interference-fitted into the light source securing member 17 having the predetermined degree of elasticity to be held in place. Here, the UV LED mounted on the substrate 72 faces upwards.

Then, the second housing 12 is fastened to the first housing 11. Here, the second housing 12 may be fastened to the first housing 11 using any typical fastener, such as a screw or a snap-in hook. The fumigation hole 14 is formed through a central portion of the second housing 12 to be aligned with the upper end of the fumigation part 91 of the chemical cartridge 90 secured to the housing 10. The fumigation part 91 may not protrude above an upper end of the fumigation hole 14, such that a user may not directly touch the upper end of the fumigation hole 14. In addition, as shown in FIG. 2, a small gap is formed between the upper end of the fumigation part 91 and the fumigation hole 14, such that the heated air inside the housing 10 can exit through the fumigation hole 14 along with the evaporated insecticide during fumigation with the insecticide.

When the second housing 12 is fastened to the first housing 11, a heater supporting member 151 protruding downward from a bottom of the second housing 12 is slightly pressed against the upper end of the heater 50. In this manner, once the second housing 12 is coupled to the first housing 11, the heater 50 can be prevented from slipping upward from the heater securing member 15. Similarly, a light source support member 171 is slightly pressed against an upper edge of the substrate 72 to prevent the substrate 72 from being separated therefrom. Further, an outer bottom surface of the second housing 12 is pressed against the fastening plate 21 fitted in the plug securing portion 112, such that the fastening plate 21 with the plug 20 secured thereto can be firmly secured to the housing 10.

According to an exemplary embodiment, assembly of the fumigator can be achieved through a simple process in which, after the plug 20 is electrically connected to the heater 50 and the light source 70 through wires 22 and 24 or the like, the plug 20, the heater 50, and the light source 70 are provisionally secured to the first housing 11, which, in turn, is fastened to the second housing 12. Further, the aforementioned components provisionally secured to the first housing 11 can be firmly secured at the same time as the second housing 12 is fastened to the first housing 11, thereby further reducing the number of assembly steps.

The second housing 12 is formed with a light passage hole 18 that corresponds to the location to the UV LED 71 disposed in the housing 10. The light passage hole 18 allows UV light from the UV LED 71 to be radiated towards the outside of the housing 10. A protective window 80 closing the light passage hole 18 may be further provided to protect the UV LED 71, as needed. The protective window 80 may be formed of a material that transmits UV light in the UVA region therethrough, and has high light transmittance to prevent the protective window 80 from being deteriorated due to absorption of a high level of energy of UV light. Examples of the material of the protective window 80 may include quartz, poly(methyl methacrylate) (PMMA) having a monomer content of 80% or more, or a fluorine-based synthetic resin, such as TEFLON™ manufactured by DuPont.

The UV LED 71 may be covered with a hemispherical lens, as shown in FIG. 2. When the UV LED 71 is mounted along with the hemispherical primary lens and form a package, an LED chip can be protected by the primary lens, thereby eliminating the need for the protective window 80. The primary lens has a hemispherical shape centered on a light emission point of the UV LED 71, thereby minimizing reflection of UV light at the boundary of the lens.

In the fumigator shown in FIG. 1 and FIG. 2, when electric power is applied to the heater 50 and the substrate 72 through the plug 20 inserted into a wall receptacle, both fumigation with the insecticide and UV radiation are initiated. UV light is radiated in an upward direction, which corresponds to a fumigation direction, such that mosquitoes can be attracted to UV light radiated to a space above the fumigator where the insecticide is present at high concentration.

The housing 10 includes an air inlet hole 61 at least through a side surface thereof, through which cool air is introduced into an inner space of the housing 10, which becomes empty as the air heated by the heater 50 is discharged through the fumigation part 91. Since the light source 70 is located between the air inlet hole 61 and the heater 50, the light source 70 can be sufficiently cooled by the air introduced through the air inlet hole 61 while being minimally affected by the air heated by the heater 50.

In addition, the light source 70 is located opposite to the plug 20 with respect to the fumigation part 91. Since the plug 20 is disposed at a rear side of the fumigator facing a wall, whereby the light source 70 is disposed in front of the fumigation part 91, a region above the fumigation part 91 to which UV light is radiated can be widened to the greater extent. In addition, with this structure, air may be introduced more smoothly through the air inlet hole 61 formed through the front surface of the housing 10.

FIG. 3 to FIG. 6 are cross-sectional views of insecticide fumigators according to exemplary embodiments. With regard to FIG. 3 to FIG. 6, descriptions of substantially the same components and features described above with respect to FIGS. 1 and 2 will be omitted to avoid redundancy.

Figure 3:
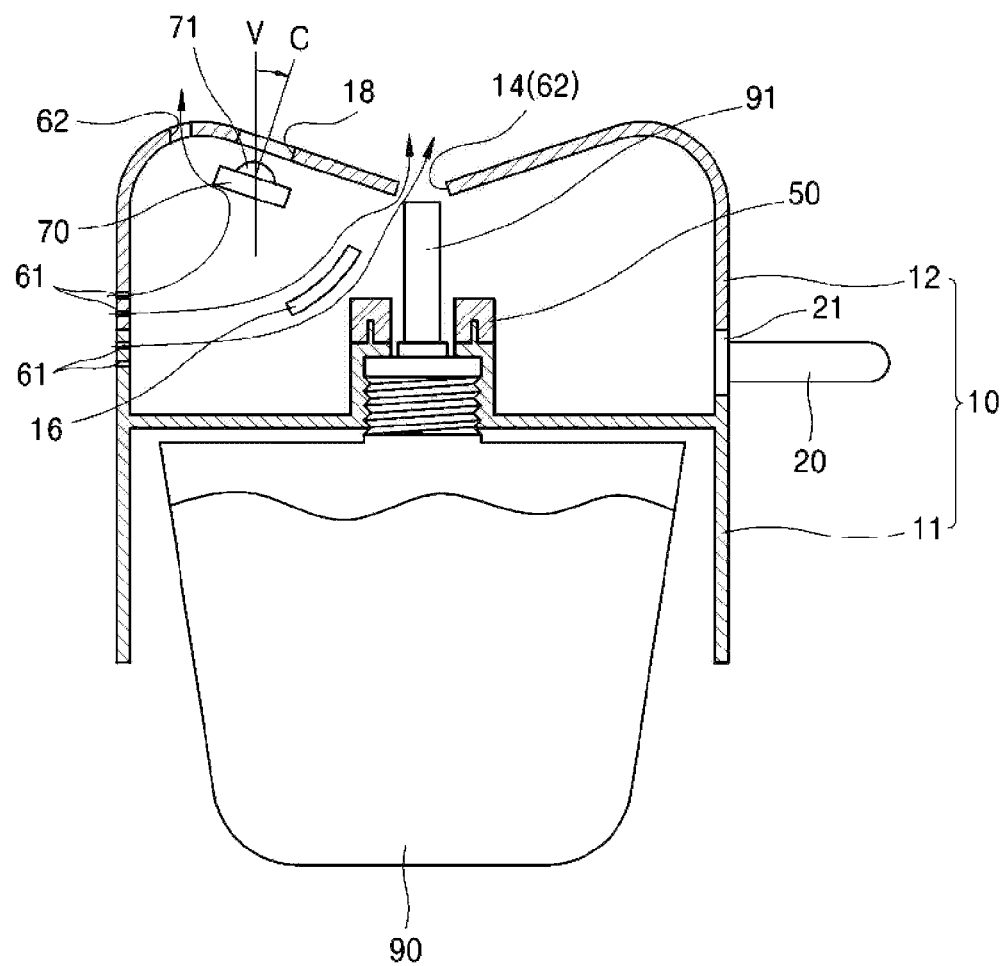
FIG. 3, FIG. 4, FIG. 5, and FIG. 6 are cross-sectional views of insecticide fumigators according to exemplary embodiments.

Referring to FIG. 3, in the fumigator according to an exemplary embodiment, the second housing 12 has an upper surface recessed toward the center thereof. In addition, the UV LED 71 is disposed in front of the fumigation part 91, such that the center line "c" of the light emission angle of the UV LED is slightly tilted backward with respect to the vertical line "v". Further, the light passage hole 18 is formed through a portion of the housing 10 above the UV LED 71 in a direction of the center line "c". Specifically, the center line may be tilted at an angle in a range of 0 degrees (the center line corresponding to the vertical line v) to 90 degrees in the backward direction with respect to the vertical line "v".

When the UV LED 71 is tilted backward as shown in FIG. 3, the human eye can be prevented from being directly exposed to UV light from the UV LED of the fumigator. Although near-UV radiation with a peak wavelength of 365 nm (UVA band) is almost harmless to humans, the possibility of eye diseases due to overexposure to near-UV light cannot be completely ruled out. According to the illustrated exemplary embodiment, the UV LED is configured to emit UV light at an angle slightly tilted backward, thereby preventing the human eye from being directly exposed to UV light, while allowing UV light from the UV LED to reach a wall and to be scattered from the wall, whereby distant mosquitoes from the fumigator can be attracted to the wall by which UV light is scattered.

In addition, referring to FIG. 3, a shielding member 16 is disposed between the heater 50 and the light source 70. The shielding member 16 is positioned to prevent heat generated by the heater 50 from being transferred to the light source 70 by radiation, that is, placed on a straight line connecting the shielding member 16 to the heater 50. Further, the shielding member 16 is positioned and shaped to prevent heat of the air heated by the heater 50 from being transferred to the light source 70 by convection. Accordingly, a surface of the shielding member 16 facing the heater 50 is curved, such that a distance to the fumigation part 91 decreases toward the top thereof. When the shielding member 16 is provided in the form of a thin vane while satisfying these two conditions, the air introduced through the air inlet hole 61 opposite the heater 50 with respect to the light source 70 can be guided by the vane to be discharged through the fumigation hole 14. In this manner, heat generated by the heater 50 may be prevented from being transferred to the light source 70 by convection, while improving insecticide vapor diffusion. In particular, the fumigation hole 14 may function as an air outlet hole through which the air introduced into the housing 10 through the air inlet hole 61 is discharged after cooling the components inside the housing 10.

In addition, a separate air outlet hole 62 may further be formed through an uppermost portion of the housing 10 in proximity to the light source 70, as shown in FIG. 3, such that the air introduced through the air inlet hole 61 can travel along the inclined upper surface of the housing 10 and smoothly discharged through the air outlet hole 62 after absorbing heat generated by the light source 70 (that is, after cooling the light source 70). When a separate protective window 80 closing the UV light passage hole 18 is omitted, the heated air can be smoothly discharged through the UV light passage hole 18.

Figure 4:
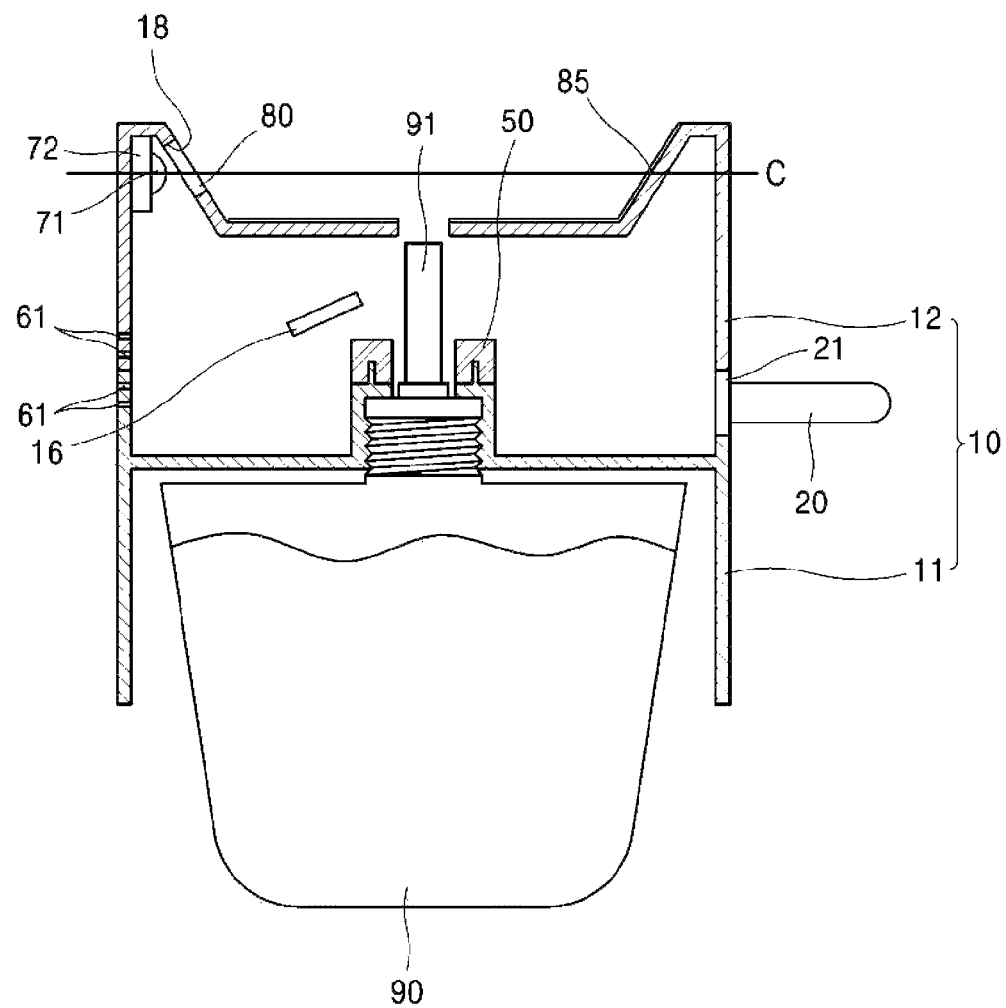

Referring to FIG. 4, a fumigator according to an exemplary embodiment includes the light source 70 disposed at a front upper end side of the housing 10, such that the center line "c" of the light emission angle of the UV LED faces backward in a substantially horizontal direction. More particularly, a central portion of the upper surface of the second housing 12 is located below the center line "c" of the light emission angle of the UV LED 71, and a portion of the upper surface of the second housing 12 outside the central portion is inclined upward to cross the center line "c" of the light emission angle of the UV LED 71. Further, the housing 10 is provided on the upper surface thereof with a reflective film 85 having high UV reflectance.

When the fumigator having such a structure is supplied with power and the UV LED emits UV light, light beams emitted to above the center line "c" directly reach above a wall portion, on which the fumigator is mounted. In this manner, light beams emitted to below the center line "c" are reflected by the reflective film 85 to be directed upward, toward above the fumigator and toward the wall, and light beams emitted along the center line "c" are reflected by a portion of the inclined surface crossing the center line "c" to be directed upwards. Accordingly, even when the center line of the light emission angle of the UV LED is horizontal, UV light from the UV LED can be radiated to a space above the fumigator and to the wall. In particular, in the fumigator shown in FIG. 4, since UV light passing directly above the fumigation hole 14 has very high illumination intensity and particles of the evaporated insecticide are present at high densities in the vicinity of an entrance of the fumigation hole 14, the UV light is scattered from surfaces of the particles. Since UV light has a shorter wavelength, and thus, is scattered to the greater extent than visible light, the light scattered from the surfaces of the particles is highly visible to mosquitoes while being invisible to humans. In this manner, the fumigator shown in FIG. 4 can further improve mosquito luring efficacy.

Figure 5:
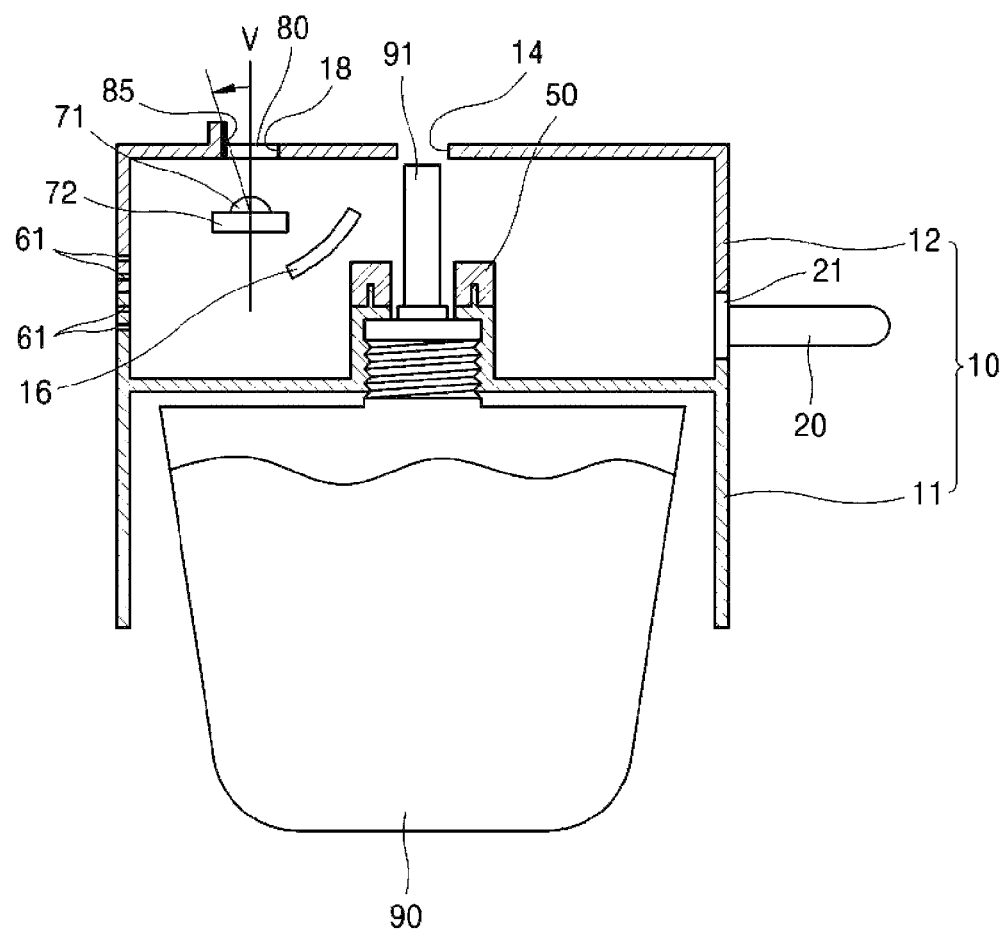

Referring to FIG. 5, the light emission angle of the UV LED of a fumigator according to an exemplary embodiment may be restricted by the light passage hole 18. In particular, the radiation range of UV light emitted from the UV LED 71 to a forward direction with respect to the vertical line "v" may be determined by the position of the light passage hole 18 relative to the UV LED 71. Since a wall receptacle is generally located below the height of an average person, when the UV LED emits UV light to a forward direction with respect to the vertical line "v" over an angle of 30 degrees or less, the possibility of direct exposure of the human eye to UV light can be significantly reduced.

In addition, the light passage hole 18 is provided with a reflective film 85 on an inner surface thereof, particularly, at a portion restricting the radiation range of UV light emitted to the forward direction with respect to the vertical line "v", such that UV light restricted in forward radiation range by the shape of the light passage hole 18 can be redirected backward by the reflective film 85, thereby further improving mosquito luring efficacy.

Figure 6:
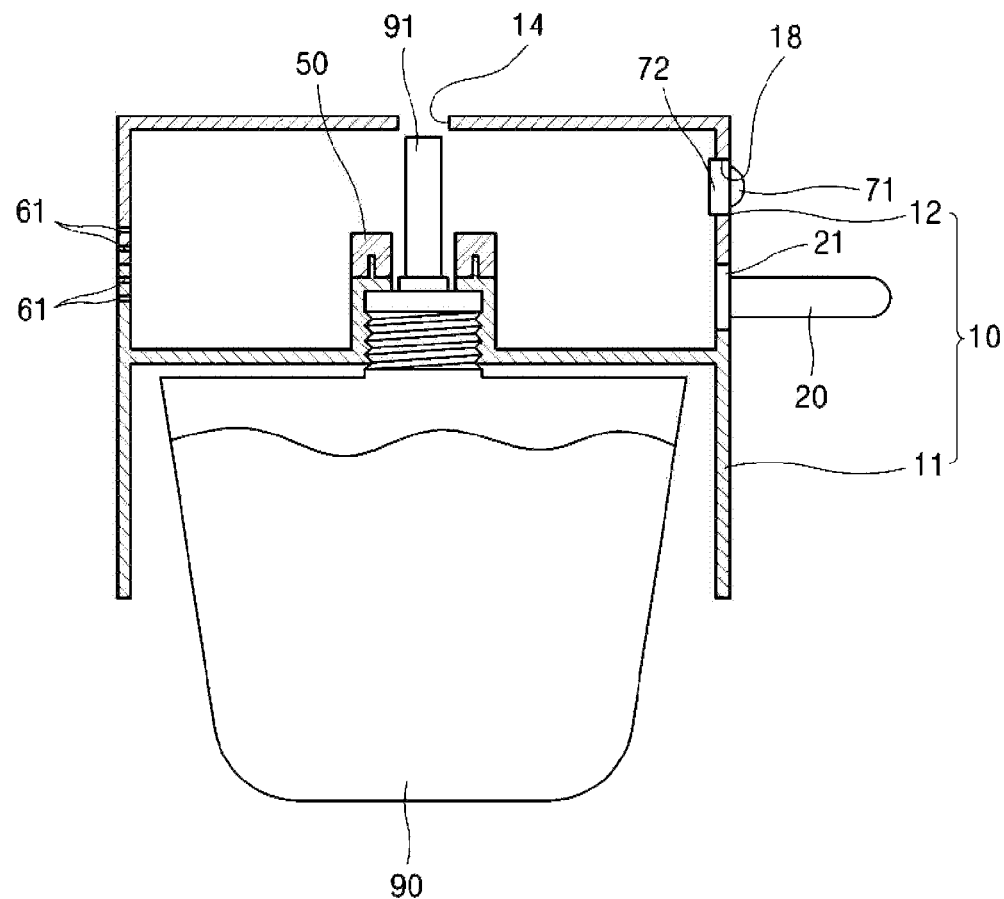

Referring to FIG. 6, a fumigator according to another exemplary embodiment includes the UV LED 71 disposed at a rear side of the housing 10 to face backward. In this manner, when the fumigator is installed on a wall, the possibility that the UV LED 71 will be visible to a person can be significantly reduced, while UV light from the UV LED 71 is scattered or reflected from a surface of the wall to be perceived as indirect illumination by mosquitoes. In this way, the fumigator shown in FIG. 6 can improve mosquito luring efficacy. Particularly, in the fumigator shown in FIG. 6, a secondary lens may be disposed in front of the UV LED 71 facing backward to widen the UV radiation angle and change the UV radiation direction from forward to sideways, thereby further improving mosquito luring efficacy.

Figure 7:
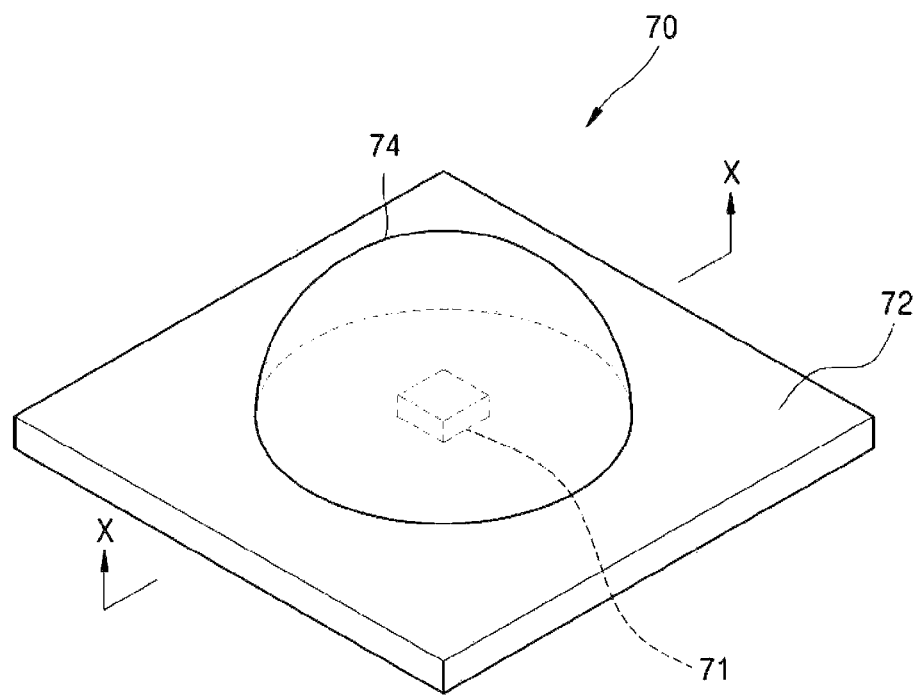
FIG. 7 is a perspective view of a light source used in the insecticide fumigator of FIG. 6 according to an exemplary embodiment.
Figure 8:
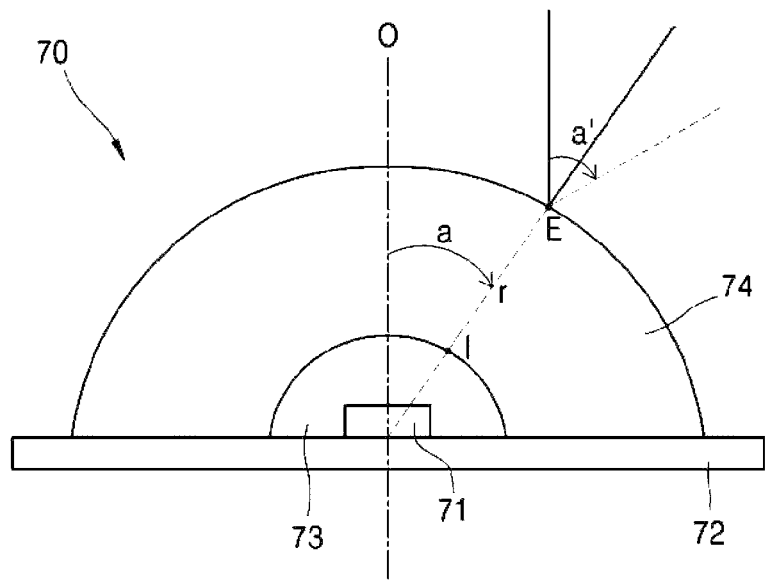
FIG. 8 is a cross-sectional view taken along line X-X of FIG. 7.

FIG. 7 is a perspective view of the light source of the fumigator of FIG. 6 according to an exemplary embodiment, and FIG. 8 is a cross-sectional view taken along line X-X of FIG. 7. Referring to FIG. 7, the light source 70 of the fumigator of FIG. 6 includes a UV LED 71 mounted on a substrate 72 and a lens integrally or separately formed on the substrate 72 to cover the UV LED 71. When the UV LED 71 faces backward as shown in FIG. 6, the lens of the light source 70 controls an optical path such that the beam spread angle of UV light from the UV LED 71 can be widened to the greater extent, whereby UV radiation is widely diffused over the wall around the fumigation part 91 rather than concentrated in a wall portion right behind the fumigation part 91.

Referring to FIG. 8, when an angle of an optical path of light from the UV LED 71 with respect to a central axis "O" of a light emission region of the UV LED 71 is indicated by angle "a", a surface profile of a secondary lens 74 is formed, such that the distance "r" from a light emission point of the UV LED 71 to a light exiting point "E" of a surface of the secondary lens 74 gradually increases as angle "a" increases. In this manner, as UV light from the UV LED 71 is refracted through the surface of the secondary lens 74, the angle of the optical path changes from a to a' (a<a'). As such, a diffusion angle of UV light from the UV LED 71 is laterally (in cross-sectional view) widened by the secondary lens 74. The secondary lens 74 has a shape like the half of a balloon pressed slightly flat from above.

When the secondary lens 74 is disposed over a primary lens 73 mounted on the substrate 72 together with the UV LED 71 to form a package, UV light from the UV LED 71 is radiated over a wider angle and thus can be widely diffused over the wall region around the fumigation part 91.

However, UV light passing through the secondary lens 74 is still concentrated in a region in front of the UV LED 71. Hereinafter, a secondary lens according to an exemplary embodiment will be described which can allow UV light emitted toward the front of the UV LED to be redirected sideways as much as possible, such that a wider area can be irradiated with UV light under installation conditions as shown in FIG. 6, thereby further improving mosquito luring efficacy.

Figure 9:
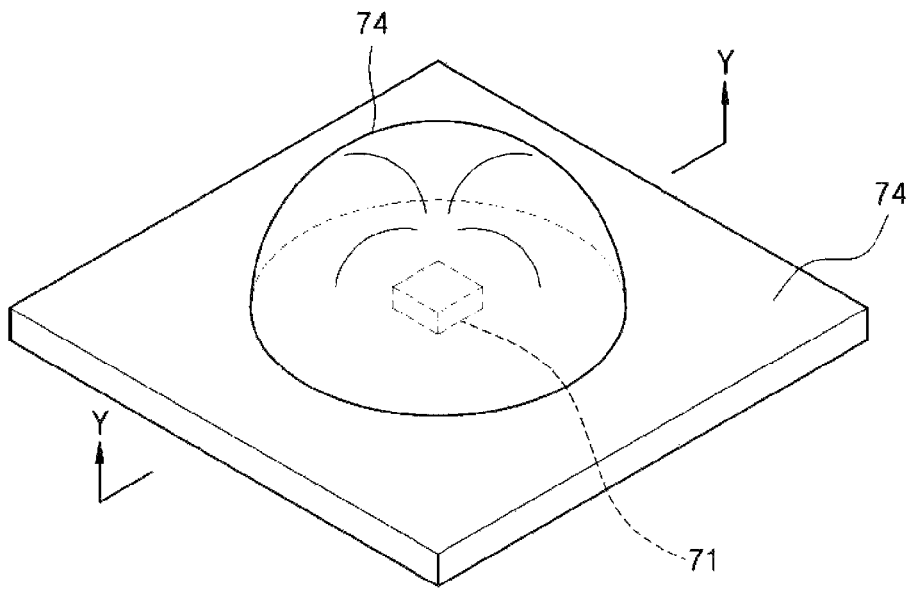
FIG. 9 is a perspective view of a light source used in the insecticide fumigator of FIG. 6 according to an exemplary embodiment.
Figure 10:
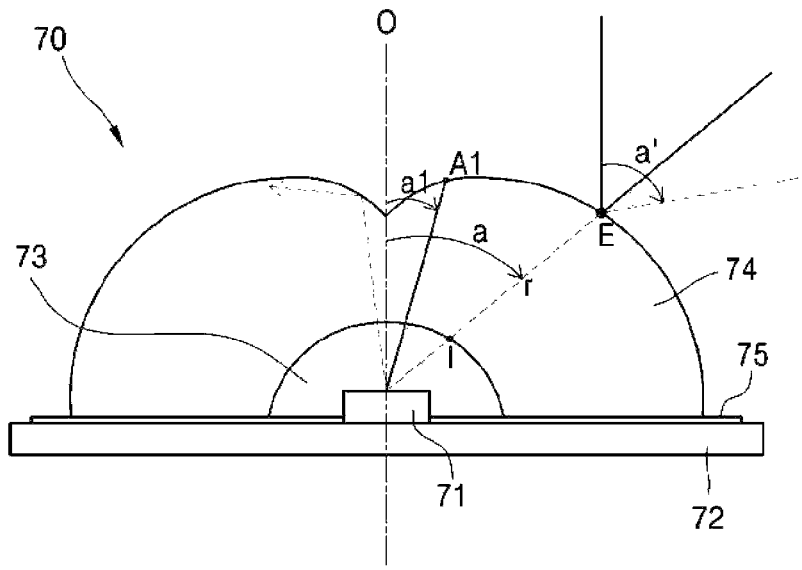
FIG. 10 is a cross-sectional view taken along line Y-Y of FIG. 9.

FIG. 9 is a perspective view of a light source used in the fumigator shown in FIG. 6 according to an exemplary embodiment, and FIG. 10 is a cross-sectional view taken along line Y-Y of FIG. 9.

A light source shown in FIG. 9 differs from the light source shown in FIG. 7 in that a secondary lens 74 has a shape formed by further pressing the center of the secondary lens 74 shown in FIG. 7 using a pointed pin, such that a central portion of the lens is recessed. In particular, the secondary lens 74 shown in FIG. 9 differs from the secondary lens shown in FIG. 7 in that a recessed region (0<a<a1) is formed around the central axis O of the light emission region in a cross-sectional view (FIG. 10). The recessed region extends outward at an angle from the central axis O of the light emission region of the UV LED 71 and gradually decreases in slope toward the outside (e.g., has a convex shape).

Referring to FIG. 10, the secondary lens 74 having the recessed region exhibits higher light diffusion efficacy than the secondary lens 74 without the recessed region. In particular, in the recessed region, total internal reflection occurs or a significant fraction of light reaching a surface of the lens is reflected to be redirected sideways. As such, UV light which would otherwise be concentrated in the vicinity of the central axis of the light emission region can be significantly diffused. Within a region extending from the central axis to the point A1, UV light from the UV LED 71 is reflected or totally internally reflected to be redirected sideways. According to an exemplary embodiment, a reflective film 75 may be formed on a bottom surface of the secondary lens 74 or on the substrate 72, considering that some fraction of UV light can be returned to the substrate 72 after being reflected or totally internally reflected by an outer surface E of the secondary lens 74. In this manner, UV light from the UV LED 71 can be further diffused by being reflected by the reflective film 75.

More particularly, even when the UV LED 71 is disposed at a location as shown in FIG. 6, when the secondary lens 74 has a structure as shown in FIG. 7 or FIG. 9, UV light from the UV LED 71 can be radiated over a wider area, thereby improving mosquito luring efficacy without UV light being directly exposed to the human eye.

Figure 11:
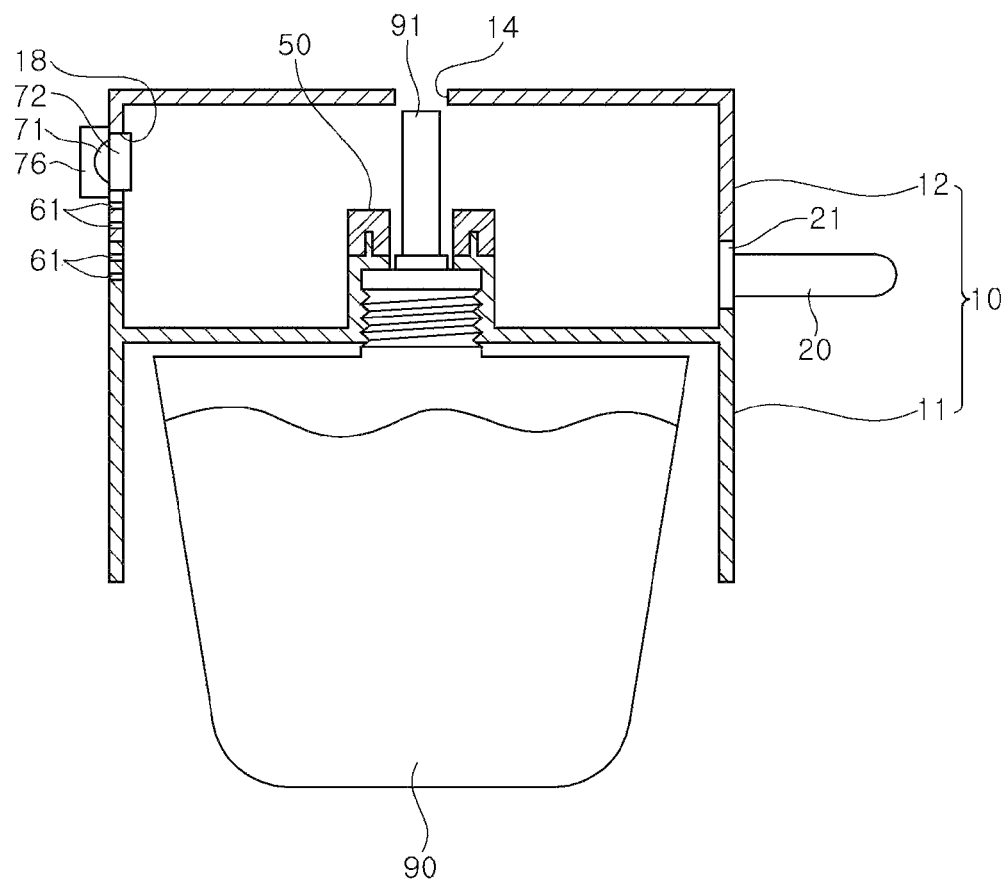
FIG. 11 is a cross-sectional view of an insecticide fumigator according to an exemplary embodiment.

FIG. 11 shows a fumigator according to an exemplary embodiment, in which the UV LED 71 is disposed at a front side of the housing 10 to face forward, and a cover 76 is further disposed in front of the UV LED 71. The cover 76 may have any suitable shape without limitation and may be detachably disposed in front of the UV LED 71, such that a user can easily replace the UV LED 71. In addition, the cover 76 may be formed of a material capable of transmitting light from the UV LED 71 therethrough and may be embossed or have a separate cover plate (not shown) attached to or disposed separate from a front or back surface of the cover 76, so as to refract or diffuse the light from UV LED 71. Insect pests, especially mosquitoes, tend to be more attracted to refracted or diffused light than to direct light. The fumigator according to the illustrated exemplary embodiment allows light from the UV LED 71 to be refracted or diffused through the cover 76 rather than being radiated directly, thereby improving mosquito luring efficacy.

For example, the cover 76 may be partially or completely formed of a light transmissive material. For example, a portion of the cover 76 through which light from the UV LED 71 passes may be formed of a material, such as polycarbonate (PC), polyethylene terephthalate (PET), methacrylate-styrene (MS), and poly(methyl methacrylate) (PMMA), and may be transparent, translucent, and/or colored.

When the insecticide fumigator includes the UV LED 71 disposed at the front side of the housing 10 to face forward, light from the UV LED 71 can be radiated over a wider area. Furthermore, when the cover 76 is disposed in front of the UV LED 71, light from the UV LED 71 can be refracted or diffused, thereby improving mosquito luring efficacy while the human eye can be prevented from being directly exposed to UV light, thereby preventing damage to the human eye due to continuous exposure to UV light. Further, the fumigator can minimize an insecticide fumigation rate, thereby minimizing the risk of disease from evaporated insecticide.

Figure 12:
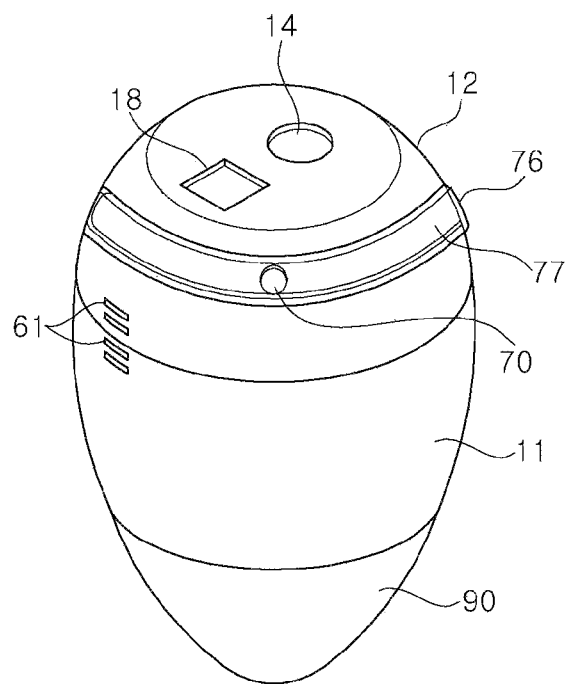
FIG. 12 is a perspective view of an insecticide fumigator according to an exemplary embodiment.

FIG. 12 shows a fumigator according to an exemplary embodiment, in which a guide rail 77 is formed on at least one side of the housing 10 to guide the UV LED 71. Accordingly, the UV LED 71 is movable on an outer peripheral surface of the housing 10 along the guide rail 77 either manually or automatically using a separate drive unit. Here, the drive unit may be any known drive unit, such as an electric motor or a hydraulic cylinder, and serves to move the UV LED 71 or the light source 70 including the same along the guide rail 77. In particular, the insecticide fumigator according to the illustrated exemplary embodiment can easily change the light emission direction of the UV LED 71, which is a mosquito luring light source, thereby retaining high mosquito luring efficacy under varying installation conditions.

In addition, the insecticide fumigator may further include a cover 76 covering the guide rail 77, as shown in FIG. 12. The configuration and material for the cover 76 may be the same as the cover described above with reference to FIG. 11. In this manner, the insecticide fumigator can retain high insect pest (particularly, mosquito) luring efficacy under varying installation conditions, and can allow light from the UV LED 71 to be refracted or diffused through the cover 76 thereby further improving mosquito luring efficacy without the possibility of UV light being directly exposed to the human eye.

According to exemplary embodiments, an electric fumigator may include a UV LED disposed near a fumigation part to attract mosquitoes to a region around the fumigation part. In addition, an electric fumigator according to an exemplary embodiment may prevent UV light from a UV LED from being directly radiated to the eyes of a person indoors. Furthermore, an electric fumigator according to an exemplary embodiment may have a structure in which a heater heating a fumigation part and a UV LED are disposed in the same housing part, and thus is easy to control. In addition, an electric fumigator according to an exemplary embodiment may further include a vane preventing heat generated by a heater from being transferred to a UV LED and guiding the flow of air, thereby further facilitating fumigation while improving luminous efficacy. Moreover, an electric fumigator according to an exemplary embodiment may use a UV LED having a narrow spectral line half width around a peak wavelength and emitting UV light in a wavelength range most effective in luring mosquitoes. With the UV LED disposed near the fumigation part, the electric fumigator according to the present invention can attract mosquitoes to a region where an insecticide is present in high concentrations, thereby improving insecticidal efficacy.

In addition, the electric fumigator according to an exemplary embodiment may prevent the human eye from being directly exposed to UV light from the UV LED, thereby preventing damage to the human eye due to continuous exposure to UV light, and can minimize an insecticide fumigation rate without reduction in insecticidal efficacy, thereby minimizing the risk of physical diseases due to the evaporated insecticide. Further, the electric fumigator according to an exemplary embodiment is easy to produce, is cost competitive, and is easy to maintain. Furthermore, with proper placement and characteristics of the UV LED that consumes less energy, emits light at a wavelength effective in luring mosquitoes with high luminous efficacy, and has further improved luminous efficacy due to good heat dissipation. Moreover, the electric fumigator according to an exemplary embodiment can improve both mosquito luring efficacy and energy efficiency. In addition, with the cover further provided to cover the UV LED, the electric fumigator according to an exemplary embodiment can refract or diffuse mosquito luring light, thereby improving mosquito luring efficacy while preventing UV light from being directly radiated to the human eye. Still, with the guide rail further provided to guide the movement of the UV LED, the electric fumigator according to an exemplary embodiment can easily redirect mosquito luring light, thereby improving mosquito luring efficacy regardless of installation conditions.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Further, it should be understood that, although effects of a certain component of the present invention are not clearly stated in description of the embodiments, predictable effects of that component are also recognized.

What is claimed is:

1. An insecticide fumigator, comprising:
   a chemical cartridge mount on which a chemical cartridge is configured to be mounted;
   a heater disposed near the chemical cartridge mount and configured to heat the chemical cartridge such that an insecticide in the chemical cartridge is evaporated from a fumigation part of the chemical cartridge;
   a light source disposed above the fumigation part and comprising a UV LED configured to emit UV light having a spectral line half-width less than 10 nm and a substrate on which the UV LED is mounted;
   a transparent material disposed at a location corresponding to the UV LED to protect the UV LED, the transparent material being configured to transmit UV light in a UVA region therethrough; and
   a housing provided with the chemical cartridge mount and receiving the heater and the light source, the housing including:
   a light passage hole above the UV LED through which light emitted from the light source passes;
   an air inlet hole formed on a portion of the housing to oppose the heater with respect to the light source; and
   a shielding member disposed between the light source and the heater to prevent heat generated by the heater from being transferred to the light source,
   wherein air introduced into the housing through the air inlet hole flows through opposing surfaces of the shielding member respectively facing the light source and the heater, and
   wherein the transparent material covers the light passage hole while being coplanar with an outer surface of the housing.

2. The insecticide fumigator according to claim 1, wherein a center line of a light emission angle of the UV LED is tilted at an angle of 90 degrees or less with respect to a vertical line intersecting a bottom surface of the insecticide fumigator.

3. The insecticide fumigator according to claim 2, further comprising a reflective film disposed on a surface of the housing behind the UV LED to redirect UV light emitted upward.

4. The insecticide fumigator according to claim 1, wherein the light passage hole restricts a radiation range of UV light emitted outside the housing.

5. The insecticide fumigator according to claim 4, wherein the radiation range of UV light emitted is within an angle of 30 degrees or less with respect to a vertical line intersecting a bottom surface of the insecticide fumigator the vertical line.

6. The insecticide fumigator according to claim 4, further comprising a reflective film disposed at a portion of the light passage hole.

7. The insecticide fumigator according to claim 1, wherein the light source is disposed at a rear side of the housing to emit UV light adjacent to a plug of the insecticide fumigator.

8. The insecticide fumigator according to claim 7, further comprising a lens disposed on the UV LED,
   wherein the lens has a shape in which, at least in some sections, a distance from a light emission point of the UV LED to an outer surface of the lens increases with an increasing distance from a central axis of a light emission region of the UV LED.

9. The insecticide fumigator according to claim 8, wherein the lens comprises a recessed region centered on the central axis of the light emission region of the UV LED and extending from the central axis of the light emission region at a predetermined angle.

10. The insecticide fumigator according to claim 2, further comprising a plug disposed at a rear side of the housing and protruding outwardly.

11. The insecticide fumigator according to claim 1, wherein the shielding member has a shape of a vane to guide air introduced through the air inlet hole formed in the housing to an air outlet hole disposed above the air inlet hole.

12. The insecticide fumigator according to claim 11, wherein the air outlet hole comprises a fumigation hole formed through the housing above the fumigation part.

13. The insecticide fumigator according to claim 1, wherein the housing comprises a first housing and a second housing coupled to each other, the first housing comprising:
    a heater securing member to secure the heater;
    a light source securing member to secure the light source; and
    a plug securing portion to which a fastening plate with a plug mounted thereon is secured.

14. The insecticide fumigator according to claim 13, wherein the second housing comprises at least one of:
    a heater support member to prevent the heater from being separated from the heater securing member after the second housing is coupled to the first housing; and
    a light source support member to prevent the light source from being separated from the light source securing member after the second housing is coupled to the first housing.

15. The insecticide fumigator according to claim 1, wherein a peak wavelength of light emitted from the light source is in a range of about 360 nm to about 370 nm.

16. The insecticide fumigator according to claim 1, further comprising a cover covering the light source, wherein the light source is disposed at a front side of the housing to emit UV light towards a first direction intersecting a bottom surface of the insecticide fumigator.

17. The insecticide fumigator according to claim 1, wherein the housing comprises:
   a guide rail disposed on the outer surface of the housing by which the light source is moved therealong to change a direction of light emitted from the light source; and
   a cover covering the guide rail.

18. The insecticide fumigator according to claim 1, wherein the spectral line half-width of UV light emitted from the UV LED is in a range of 9 nm to 10 nm.

* * * * *